United States Patent [19]

Yoshida et al.

[11] Patent Number: 4,548,682

[45] Date of Patent: Oct. 22, 1985

[54] PROCESS OF PRODUCING MAGNETIC RECORDING MEDIA

[75] Inventors: Koichi Yoshida; Yoshio Hirayama; Yasuo Oka; Takashi Kajiyama, all of Shizuoka, Japan

[73] Assignee: Nippon Light Metal Company Limited, Tokyo, Japan

[21] Appl. No.: 618,512

[22] Filed: Jun. 8, 1984

[30] Foreign Application Priority Data

Jun. 10, 1983 [JP] Japan .................................. 58-103978
Oct. 7, 1983 [JP] Japan .................................. 58-187766

[51] Int. Cl.$^4$ ............................................. C25D 11/20
[52] U.S. Cl. .................... 204/35.1; 204/37.6; 204/42
[58] Field of Search ............ 204/35.1, 37.6, 42; 427/130; 428/900

[56] References Cited

U.S. PATENT DOCUMENTS

| | | | |
|---|---|---|---|
| 4,109,287 | 8/1978 | Kawai et al. | 360/361 |
| 4,310,586 | 1/1982 | Sheasby et al. | 428/220 |
| 4,390,562 | 6/1983 | Yanagisawa | 427/11 |
| 4,414,271 | 11/1983 | Kitamoto et al. | 428/328 |

*Primary Examiner*—Andrew H. Metz
*Assistant Examiner*—William T. Leader
*Attorney, Agent, or Firm*—William J. Daniel

[57] ABSTRACT

A magnetic recording medium having excellent magnetic properties and a uniform recording envelope suitable for, in particular, high-density recording is obtained by packing a magnetic substance in the micro pores of anodic oxide film formed on an aluminum substrate by subjecting the same to an anodic oxidation treatment to produce an anodic oxide film having a thickness of at least 4 μm. The recording medium can be improved by immersing the anodized aluminum substrate in an acid or alkali bath to chemically dissolve a part of the anodic oxide film, and thereby enlarge the micro pores in the anodic oxide film to a pore diameter in the range of 300 Å to 1,400 Å, optionally applying an electric current to the aluminum substrate in the immersion bath if necessary to control the thickness of the barrier layer in the anodic oxide film, before subjecting the treated substrate to an electrolytic treatment in a bath containing ions of a magnetic substance to deposit the magnetic substance in the enlarged micro pores. Thereafter, the surface of the anodic oxide film, and any excess deposited magnetic material thereon, is physically ground to expose the packed magnetic substance at the surface of the film.

13 Claims, 8 Drawing Figures

PROCESS OF PRODUCING MAGNETIC RECORDING MEDIA

FIELD OF THE INVENTION

This invention relates to a process of producing a magnetic recording medium by applying an anodic oxidation to aluminum or an aluminum alloy (hereinafter, collectively referred to as aluminum), filling or packing a great number of perpendicular micro pores in the anodic oxdie film or layer thus formed with a magnetic substance, and further, applying physical grinding or polishing onto the surface thereof.

BACKGROUND OF THE INVENTION

It is known from Kawai et al U.S. Pat. No. 4,109,287 that an anodic oxidation treatment is applied onto aluminum to form an anodic oxide film or layer having a great number of micro pores, the micro pores in the anodic oxide film thus formed are then packed with a magnetic substance by various manners to form a magnetic layer, and the magnetic material thus obtained is used as a magnetic recording medium.

The remarkable feature of the magnetic recording medium prepared by the above-described manner is in that the magnetic recording medium shows so-called "perpendicular magnetic properties" since the magnetic substance exist in the perpendicular micro pores of the anodic oxide film and in such a magnetic recording medium, recording density can be greatly increased as compared to conventional magnetic recording media of a horizontal magnetization system prepared by coating a conventional magnetic material on the surface of a substrate.

In the case of using the magnetic film or layer obtained by packing the micro pores of the anodic oxide film with a magnetic substance for a magnetic recording medium, it is desired that the surface of the anodic oxide film thus formed be physically ground or polished to provide a sufficiently smooth surface, the thickness of the anodic oxide film after polishing being at least 2 $\mu$m for preventing the film from being broken by a magnetic head and obtaining sufficient magnetic properties for use with either a contact type magnetic head or a floating type magnetic head, so that the magnetic recording medium can exhibit proper magnetic properties for the kind of a magnetic head, these magnetic properties being homogneous throughout the whole surface of the magentic recording medium.

However, in an anodic oxide film obtained by a general anodic oxidation treatment which is conventionally employed, there is a problem that the magnetic properties of magnetic recording medium are inadequate since the pore diameter of the micro pores is small, whereby the surface density of the micro pores occupying the surface of the anodic oxide film is too small, and also the coercive force (Hc) is too high to perform recording and reproduction of the output is too small owing to the small pore diameter of the micro pores.

It is also known that the diameter of micro pores in the anodic oxide film largely changes according to the kind of electrolytic bath used for the anodic oxidation treatment of aluminum. For example, with a sulfuric acid bath which is most generally used as the anodic oxidation treatment bath for aluminum, the pore diameter of the micro pores of the anodic oxide film thus formed is about 100 to 200 Å, while when a phosphoric acid bath is used, the pore diamter is about 500 to 1,000 Å. Thus, as far as the diameter of micro pores is concerned, a large pore diameter is obtained by using a phosphoric acid bath, whereby a large surface density of micro pores can be obtained, but the anodic oxide film formed using a simple phosphoric acid bath is liable to become brittle and the anodic oxide film thus formed has a thickness of about 2 $\mu$m only.

On the other hand, when an anodic oxidation treatment is applied to aluminum using a bath composed of sulfuric acid, oxalic acid, or sulfosalicylic acid or a bath mainly composed of the aforesaid acids, an anodic oxide film having a strong film quality and a sufficiently thick film thickness is obtained but the pore diamter of the micro pores is small and hence it is required to enlarge the diameter of the micro pores by a secondary treatment.

For enlarging the micro pores in the anodic oxide film, a method of performing a secondary electrolysis using a phosphoric acid bath has been already proposed. However, when performing the secondary electrolysis using a phosphoric acid bath, the bottom portions of the micro pores are generally extremely enlarged, a great number of branched micro pores being further formed at the bottom portions of the micro pores, and the extraordinarily growing state of the micro pores cannot be foreseen and the extent of the extraodinary growing is not constant. Accordingly, in the case of packing the micro pores with a magnetic substance in a subsequent step, desirable perpendicular magnetic properties are not obtained and also it is impossible to perform an adjustment for obtaining appropriate magnetic properties for various magnetic heads.

From the results of various experiments made by the inventors on the enlargement of the micro pores in the anodic oxide film it is found that if an aluminum material which was subjected to an anodic oxidation treatment by using the conventional treating bath is immersed in an acid or alkaline bath to chemically dissolve a part of the anodic oxide film i.e. the walls of the micro pores, the micro pores can be uniformly enlarged through their full length and that in the enlargement of the micro pores by such chemical dissolution the diameter of the micro pores can be relatively freely controlled by properly adjusting the dissoluting conditions.

However, when a magnetic recording medium is prepared by depositing a magnetic substance in the micro pores thus enlarged as described above, the deposited amount of the magnetic substance frequently becomes microscopically nonuniform and also when such a magnetic recording medium is used as a high-density magnetic recording medium, the output becomes nonuniform to cause error. Therefore, it has been required to pack the micro pores with a magnetic substance in a microscopically uniform state.

SUMMARY OF THE INVENTION

An object of this invention is, therefore, to provide a process of producing a magnetic recording medium wherein the above-described difficulties in conventional techniques are eliminated by chemically dissolving an anodic oxide film or layer on aluminum prior to magnetically packing the micro pores in the anodic oxide film, and physically grinding to expose the packed magnetic substance at the surface of the film.

Other object of this invention is to provide a process of producing a magnetic recording medium wherein a magnetic substance is microscopically packed or deposited in micro pores of the anodic oxide film or layer formed on aluminum.

According to this invention, there is provided a process of producing a magnetic recording medium by packing micro pores of an anodic oxide film or layer obtained by applying an anodic oxidation treatment to aluminum with a magnetic substance, which comprises forming an anodic oxide film or layer having a thickness greater than 4 μm on an aluminum substrate, immersing the aluminum in an alkali bath to chemically dissolve a part of the anodic oxide film, whereby the micro pores in the anodic oxide film are enlarged to the pore diameter range of 300 Å to 1,400 Å, and after applying, if necessary, an electric current for a while through the alkali bath having immersed therein the aluminum to control the barrier layer in the anodic oxide film, applying an electrolytic treatment to the aluminum in a bath containing a magnetic substance ion to deposit the magnetic substance in the enlarged micro pores of the above-described anodic oxide film.

Furthermore, the magnetic substance deposited in the micro pores or overflowing from the micro pores is physically ground or polished to expose the surface of the anodic oxide film.

DETAILED DESCRIPTION OF THE INVENTION

FIGS. 1A to 1F are schematic views showing the steps of the process of this invention.

There is no particular restriction on the kind of aluminum substrate 1 which is used in this invention but a material capable of readily forming an anodic oxide film thereon, such as pure aluminum, 5 × × × aluminum, 6 × × × aluminum, etc., is preferred. As the electrolytic bath for the anodic oxidation treatment of aluminum, a bath composed of sulfuric acid, sulfamic acid, chromic acid or composed mainly of such inorganic acid, or a mixture of an organic acid such as sulfosalycilic acid, oxalic acid, malonic acid etc., added with an inorganic acid can be used. Furthermore, an alkali bath mainly composed of sodium phosphate, sodium hydroxide, etc., can be also used.

Figure 1A:
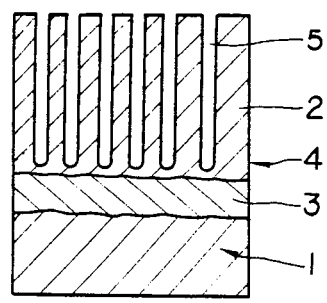
FIGS. 1A to 1F are schematic views showing the steps of the process of this invention and FIGS. 2A and 2B show comparison views of the envelope of aluminum product obtained by the treatment in the example of this invention and the envelope of an aluminum product treated in a conventional manner.

By applying an anodic oxidation treatment to aluminum at a current density of 0.1 to 3.0 A/dm$^2$ and a voltage of 5 to 80 volts in direct current or alternating current while properly selecting the composition of the bath and being the at bath temperature of 0° to 40° C., an anodic oxidation film 4 composed of a porous layer 2 and a barrier layer 3 is formed with a thickness of thicker than 4 μm so that the deposition or packing of a magnetic substance can be easily performed in a subsequent step and the anodic oxide film can retain a thickness thereof of at least about 2 μm after grinding or polishing. The state of the anodized substrate before chemically dissolving the surface of the anodic oxide film is shown in FIG. 1A.

In addition, if the thickness of the anodic oxide film is less than about 4 μm, a magnetic substance is reluctant to deposit uniformly even locally. If the magnetic substance locally comes out on the surface of the film 4, the electric current is concentrated at the portions to obstruct the deposition of magnetic substance onto other portions, which results in a problem that the micro pores 5 are not sufficiently packed with the magnetic substance throughout their entirety.

Figure 1B:
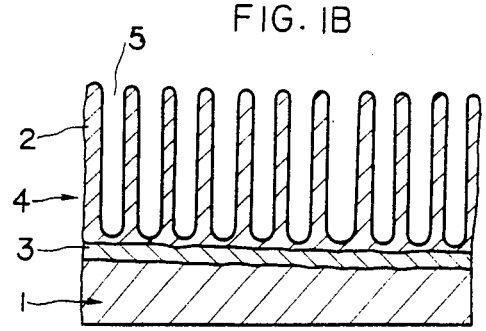

Then, the walls of the micro pores 5 in the anodized substrate are chemically dissolved to enlarge the pore diameter as shown in FIG. 1B. Since a coercive force depends on the pore diamter, the coercive force of the magnetic recording medium thus obtained can be quantitatively controlled by precisely carrying out this treatment.

The bath which is used for the chemical dissolution is an acid bath composed of phosphoric acid, chromic acid, sulfamic sulfuric acid, oxalic acid or two or more such acids, or an alkaline bath such as a dilute solution of sodium hydroxide, potassium hydroxide, etc., or a solution of sodium tertiary phosphate and the bath temperature ranges from ordinary room temperature to about 50° C. If the bath temperature and the concentration of acid or alkali are too high, the dissolution occurs too quickly, whereby the diameters of the micro pores are liable to become nonuniform, and there is the possibility of dissolving the anodic oxide film beyond the necessary extent. Also, the time for the dissolution depends on the desired pore diameter obtained by chemically dissolving the micro pores formed by the anodic oxidation treatment but when the dissolution time is 5 to 30 minutes, preferably 10 to 20 minutes, the pore diameter can be easily controlled. Thus, the diamter of the micro pores is enlarged to 300 to 1,400 Å, preferably 400 to 1,000 Å.

In addition, in the case of enlarging the micro pores 5 by an acid or alkali, the thickness of the barrier layer 3 at the bottom of the micro pores becomes uneven because of the chemical dissolution treatment and hence it is difficult to obtain the uniform deposition of the magnetic substance. Thus, it is preferred to perform a treatment for controlling barrier layer. The electric treatment for the barrier layer control can be performed in the same bath used for the above-described chemical dissolution treatment. In this case, if the voltage is too high, the barrier layer 3 becomes too thick, whereby the subsequent magnetic substance is reluctant to deposit. Also, if the voltage is too low, the thickness of the barrier layer 3 formed becomes too thin, whereby the anodic oxide film can be partially broken during the deposition step of a magnetic substance. Therefore, it is preferred that the voltage is 5 to 25 volts, particularly about 10 to 20 volts in the case of direct current and is 6 to 20 volts, particularly about 10 to 17 volts in the case of alternating current. In addition, in regard to the time for applying the electric current, 3 to 10 minutes is usually required until the electric current becomes stable. Thus, a barrier layer having a uniform thickness of 100 to 400 Å can be obtained.

Then, the aluminum substrate the barrier layer 3 of which was controlled as described above, is immersed in a bath containing a water soluble salt, that is, a sulfate, sulfamate, etc., of a magentic metal such as Fe, Co, Ni, etc., together with a supporting electrolyte, such as magnesium sulfate, etc., for facilitating the electrolytic deposition and a direct current, an alternating current, or duplicated electric current of direct current and alternating current, etc., is applied across the aluminum substrate and an insoluble counter electrode such as graphite, stainless steel, etc., the aluminum plate being an anode in the case of applying a direct current, whereby the magnetic substance 6 is deposited and packed in the micro pores 5 of the anodic oxide film.

Figure 1C:
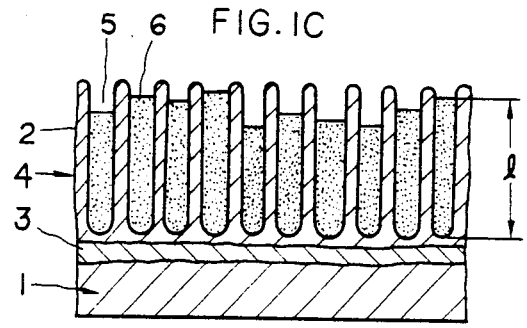

However, if the height l of the magnetic substance 6 deposited in each micro pore 5 is different between adjacent micore pores 5 as schematically shown in FIG. 1C, the packed amount of the magnetic substance 6 in each micro pore differs, which results different in magnetic properties of each packed column of the magnetic substance.

Figure 1D:
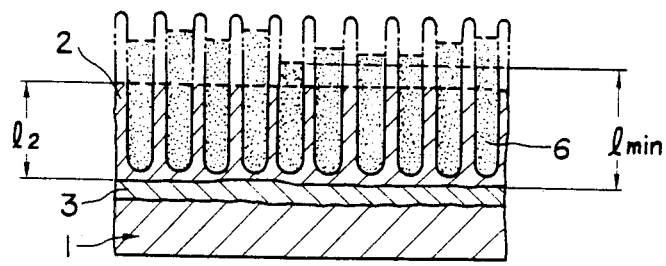

Thus, in this invention, the surface of the anodic oxide film 4 is physically ground or removed as shown in FIG. 1D to equalize the height of the depositions. The amount of the packed magnetic substance to be removed or ground away is at least the excess height exceeding $l_{min}$ of the original length l of the packed column of the magnetic substance and preferably about about 10% less than $l_{min}$. length to achieve a final height of the column of the packed magnetic substance of $l_2$. Also, since the final height $l_2$ is about 50 to 80% of the thickness of the porous layer 2, it is preferred to remove 40 to 60% of the thickness of the porous layer 2 on the substrate, whereby the entire upper surface of the packed columns of the magnetic substance are exposed at the surface of the anodic oxide film. As the result thereof, the heights of the individual columns of the magnetic substance become almost uniform, whereby the magnetic properties of each column of the magnetic substance become almost uniform or homogeneous and hence, the band-like reproduced output graph obtained by recording the reproduced output of the alternating signal recorded on an envelope magnetic recording medium on a chart, becomes good. Thus, high density reproduction is attained.

Figure 2A:
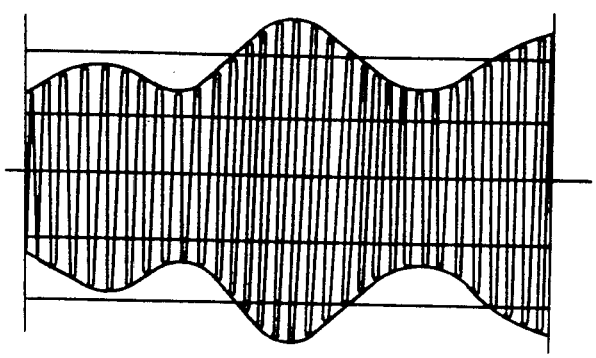
Figure 2B:
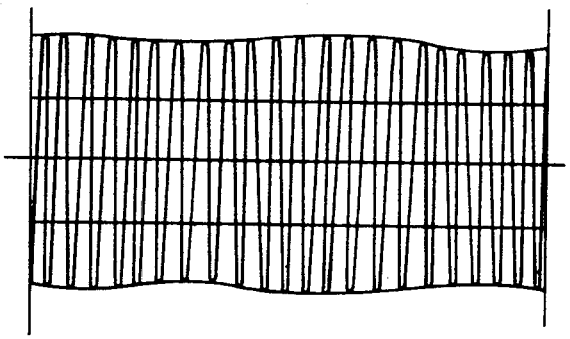

FIG. 2 shows such envelopes. In the case of grinding the surface of an anodic oxide film having micro pores, the pore diameters of which were enlarged by chemically dissolving the surface portion, after packing the micro pores with a magnetic substance, the envelope is good as shown in FIG. 2B but if one omits the steps of grinding the surface of an anodic oxide film, the surface of which was not chemically dissolved, after packing the micro pores thereof with a magnetic substance, the magnetic properties of the magnetic recording medium are not uniform, the distance between the surface of the magnetic recording medium and a head is not uniform, and the envelope is bad as shown in FIG. 2A.

As described above, according to this invention, a magnetic recording medium can be obtained wherein the micro pores of an anodic oxide film of a uniform thickness formed on the surface of aluminum are packed with a magnetic substance in the same depths as the depths of the micro pores themselves and with almost same height in each column of the packed magnetic substance.

If iron is used, for example as the magnetic substance, $l_2/D > 10$, wherein D is the diameter and $l_2$ is the height of the column of packed magnetic substance (assuming that the column is cylindrical), the magnetic recording medium shows perpendicular magnetic properties and if cobalt is used as the magnetic substance and $l_2/D > 20$, the magnetic recording medium also shows perpendicular magnetic properties. However, an attempt to reduce D for improving the perpendicular magnetic properties encounters a difficulty that the coercive force becomes too high and hence a strong magnetic head is required.

Figure 1E:
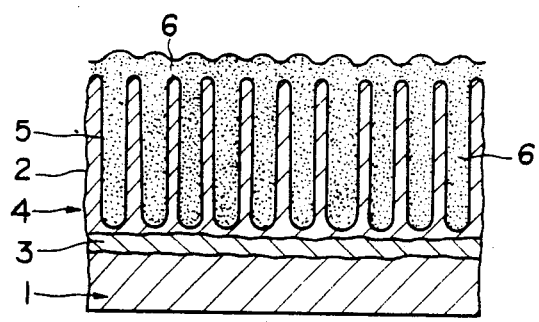

Also, in order to eliminate the problem that the height of the columns of a magnetic substance 6 packed in the micro pores is different, the process of this invention can be performed in such a manner that the magnetic substance 6 is overflowed onto the surface of the anodic oxide film 4 by depositing a sufficiently large amount of the magnetic substance in the micro pores to cover the surface of the anodic oxide film 4 with the magnetic substance 6 as shown in FIG. 1E.

In this case, the electrolytic deposition treatment of the magnetic substance is performed for a longer period of time than under ordinary circumstances. That is to say, the conditions for the deposition treatment are almost same as above but when the deposition treatment is generally performed for 5 to 30 minutes, a sufficient amount of the magnetic substance is deposited in the micro pores so that the magnetic substance adequately covers the surface of the anodic oxide film.

Figure 1F:
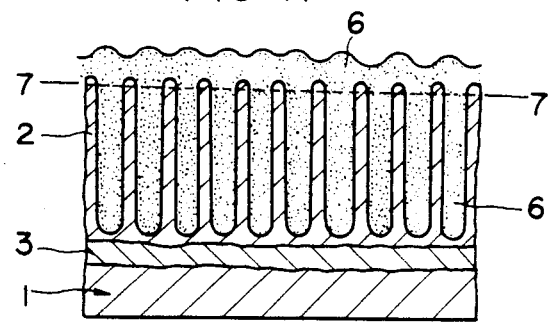

Then, by physically removing the magnetic substance 6 deposited on the surface of the anodic oxide film 4 together with a surface portion of the anodic oxide film 4 from the level 7 as shown in FIG. 1F, the same result as described above is obtained.

The magnetic film or layer thus obtained can be sensed with water and dried and the micro pores of the anodic oxide film may be sealed by a steam treatment in an ordinary manner as a corrosion resistant treatment or the surface of the anodic oxide film may be coated for protection and/or lubrication by a dry surface treatment such as sputtering of silicon oxide, etc. Lubrication can be also applied on the protection coating.

Now, the practical execution of the invention will be explained by the following examples.

EXAMPLE

Five aluminum plates of JIS A1100 were treated under the conditions described below and the coercive forces, saturation magnetizations, residual magnetizations, and the ratios of the residual magnetizations and the coercive forces were measured by means of a vibration-type magnetization measuring device and the mean values thereof are shown in Table 1. In this case, the barrier layer control treatments of Sample Nos. 1, 2 and 4 were all performed in the same bath as used for the chemical dissolution treatment and the deposition and packing treatment of the magnetic substance was performed in a bath containing 120 g/l of of ferrous sulfate, 70 g/l of magnesium sulfate, 30 g/l of boric acid, and 20 g/l of citric acid at a bath temperate of 30° C. by applying an alternating current of 60 c./sec. and 15 volts for 10 to 18 minutes using graphite as the counter electrode.

The anodic oxide film after packing the magnetic substance was ground for 15 minutes by a buff-type polisher using high-pure (99.99%) alumina polishing particules (1 μm in particle size) to provide a mean surface roughness $R_{max}$ of 0.04 μm.

In addition, for comparison, the measured values of Sample No. 4 prepared by the same manner as above except that the physical grinding treatment was not performed and Sample No. 5 prepared by the same manner as above except that the chemical dissolution treatment and the barrier layer control treatment were not performed are shown in Table 1.

TABLE 1

| | Anodic oxidation treatment | | | Chemical dissolution | | Barrier layer control | | | After physical grinding | | | | |
|---|---|---|---|---|---|---|---|---|---|---|---|---|---|
| Sample No. | Bath (temperature) | Voltage (V) | Film thickness (μm) | Bath (temperature) | Time (min) | Voltage (V) | Time (min) | Pore diameter (Å) | Layer thickness after controlling (Å) | Film thickness (μm) | Coercive force (Oe) | Br (gauss) | Bs (gauss) | Envelope |
| 1 | Oxalic acid 40 g/l (35° C.) | 35 | 6 | Phosphoric acid 100 g/l (25° C.) | 14 | DC 20 | 3 | 440 | 200 | 2.5 | 735 | 2980 | 4970 | Uniform |
| 2 | Sulfosalicylic acid 200 g/l (20° C.) | 35 | 9 | Phosphoric acid 100 g/l (30° C.) | 10 | DC 20 | 3 | 430 | 200 | 4.5 | 690 | 1670 | 4680 | Uniform |
| 3 | Sulfuric acid 165 g/l (5° C.) | 20 | 9 | Sodium phosphate 30 g/l (20° C.) | 3 | | | 260 | 200 | 4.5 | 1030 | 3820 | 4240 | Uniform |
| 4 | Oxalic acid 40 g/l (35° C.) | 35 | 6 | Phosphoric acid 100 g/l (25° C.) | 14 | DC 20 | 3 | 440 | | 6* | 730 | 1995 | 3350 | Output voltage very small and unstable |
| 5 | Oxalic acid 40 g/l (35° C.) | 35 | 6 | | | | | 285 | 200 | 2.5 | 1505 | 2030 | 2070 | Recording impossible |

*No grinding

What is claimed is:

1. A process for producing a magnetic recording medium by packing a magnetic substance in micro pores of an anodic oxide film formed on an aluminum substrate by an anodic oxidation treatment, comprising the steps of subjecting said substrate to an anodic oxidation treatment in an electrolytic bath to form an anodic oxide film having a thickness of at least 4 μm, immersing the anodized aluminum substrate in an acid bath or an alkali bath to enlarge the micro pores in said anodic oxide film to a pore diameter in the range of 300 Å to 1,400 Å by chemically dissolving the walls of said pores, then subjecting said substrate to an electrolytic treatment in a bath containing ions of a magnetic substance to deposit the metallic magnetic substance in the enlarged micro pores, and physically grinding the surface of the anodic oxide film to expose the packed magnetic substance on the surface of said film.

2. The process of producing a magnetic recording medium as claimed in claim 1, wherein the step of physical grinding is performed by depositing said magnetic substance in the micro pores and on the surface of the anodic oxide film to cover the surface thereof and then physically grinding the surface of the magnetic substance thus deposited together with the surface of said film.

3. The process of producing a magnetic recording medium as claimed in claim 1, wherein after enlarging the micro pores in the acid bath or alkali bath, an electric current is applied to the aluminum while in the same bath for a time sufficient to control the thickness of a barrier layer on the anodic oxide film.

4. The process of producing a magnetic recording medium as claimed in claim 3, wherein in the step of controlling the thickness of the barrier layer, an electrolytic current is applied for 3 to 10 minutes at 5 to 20 volts in direct current or 6 to 20 volts in alternating current.

5. The process of producing a magnetic recording medium as claimed in claim 1, wherein said electrolytic bath for said anodic oxidation treatment is acidic and comprises an acid of the group constituted of sulfuric acid, sulfamic acid, chromic acid or a mixture of an organic acid and an inorganic acid.

6. The process of producing a magnetic recording medium as claimed in claim 1, wherein said electrolytic bath for said anodic oxidation treatment is an alkaline bath comprising sodium phosphate or sodium hydroxide.

7. The process of producing a magnetic recording medium as claimed in claim 1, wherein the step of the anodic oxidation treatment is performed at a current density of 0.1 to 3.0 A/dm$^2$ and a voltage of 5 to 80 volts.

8. The process of producing a magnetic recording medium as claimed in claim 1, wherein the bath used for enlarging the pore diameter is an acid bath comprising phosphoric acid, chromic acid, sulfamic acid, sulfuric acid, oxalic acid or a mixture of at least two of these acids.

9. The process of producing a magnetic recording medium as claimed in claim 1, wherein the bath used for enlarging the pore diameter is an alkaline bath comprising a dilute solution of sodium hydroxide or potassium hydroxide, or a solution of sodium tertiary phosphate.

10. The process of producing a magnetic recording medium as claimed in claim 1, wherein the temperature of the bath used in the step of enlarging the pore diameter ranges from room temperature to 50° C.

11. The process of producing a magnetic recording medium as claimed in claim 1, wherein the bath in the metal deposition step is a bath containing a sulfate or sulfamate of a magnetic metal, and magnesium sulfate.

12. A process of producing a magnetic recording medium by packing a magnetic substance in the micro pores of an anodic oxide film formed by an anodic oxidation treatment on an aluminum substrate, which comprises forming an anodic oxide film having a thickness of at least 4 μm on said aluminum substrate by anodizing the same in an electrolytic bath, immersing the anodized aluminum in an acid bath or an alkali bath capable of chemically dissolving the anodic oxide film, whereby the micro pores in the anodic oxide film are enlarged to a pore diameter in the range of 300 Å to 1,400 Å, applying an electric current to said aluminum in said immersion bath for a sufficient time that the thickness of the barrier layer in the anodic oxide film is controlled, subjecting said substrate to an electrolytic treatment in a bath containing a magnetic substance ion to deposit the magnetic substance in said enlarged micro pores, and then physically grinding the surface of the anodic oxide film to expose the packed magnetic substance at the surface of said film.

13. A process of producing a magnetic recording medium by packing a magnetic substance in the micro pores of an anodic oxide film having a thickness of at least 4 μm on an aluminum substrate comprising: immersing an aluminum substrate with said anodic oxide film thereon in an acid bath or an alkali bath to chemically dissolve a part of of the anodic oxide film, whereby the micro pores in the anodic oxide film are enlarged to a pore diameter in the range of 300 Å to 1,400 Å, subjecting the thus-treated aluminum substrate to an electrolytic treatment in a bath containing ions of a magnetic substance to deposit the magnetic substance in said micro pores and cover the surface of the anodic oxide film with the magnetic substance, and physically grinding the surface of the magnetic substance covering the surface of the anodic oxide film together with the surface of the anodic oxide film.

* * * * *